(12) United States Patent
Shin et al.

(10) Patent No.: US 8,918,111 B2
(45) Date of Patent: Dec. 23, 2014

(54) DEVICE TO-DEVICE GROUP COMMUNICATION METHOD AND DEVICE USING THE SAME

(71) Applicant: Electronics and Telecommunications Research Institute, Daejeon (KR)

(72) Inventors: Jae Sheung Shin, Daejeon (KR); You Sun Hwang, Seoul (KR); Ae Soon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/709,548

(22) Filed: Dec. 10, 2012

(65) Prior Publication Data

US 2013/0150061 A1 Jun. 13, 2013

(30) Foreign Application Priority Data

Dec. 9, 2011 (KR) .................. 10-2011-0132209

(51) Int. Cl.
*H04W 4/00* (2009.01)
*H04W 4/08* (2009.01)
(52) U.S. Cl.
CPC ............. *H04W 4/005* (2013.01); *H04W 4/008* (2013.01); *H04W 4/08* (2013.01)
USPC .......................................... 455/450; 455/509
(58) Field of Classification Search
USPC ........... 455/450, 509; 370/230, 252, 329, 337
See application file for complete search history.

(56) References Cited

U.S. PATENT DOCUMENTS

| 2009/0019113 | A1 | 1/2009 | Wu et al. |
| 2009/0023460 | A1 | 1/2009 | Cho et al. |
| 2009/0116430 | A1 | 5/2009 | Bonta et al. |
| 2011/0191187 | A1 | 8/2011 | Charbit et al. |
| 2012/0014269 | A1* | 1/2012 | Ray et al. .............. 370/252 |

FOREIGN PATENT DOCUMENTS

| KR | 1020070073432 | 7/2007 |
| KR | 1020100038439 | 4/2010 |

* cited by examiner

*Primary Examiner* — Sam Bhattacharya
(74) *Attorney, Agent, or Firm* — Nelson Mullins Riley & Scarborough LLP

(57) ABSTRACT

Provided are a device-to-device (D2D) group communication method and a device using the same. The method includes transmitting a scheduling request for D2D group communication to a base station, receiving first radio resource information for a status report of D2D data to be transmitted from the base station, transmitting a D2D buffer status report to the base station through a first radio resource, receiving second radio resource information including D2D resource allocation information necessary for the D2D group communication from the base station, and transmitting control information for the D2D group communication including a D2D group identifier (ID) as a device ID and D2D user data to two or more communication partner devices belonging to the D2D group.

15 Claims, 9 Drawing Sheets

(A)  (B)

DEVICE TO-DEVICE GROUP COMMUNICATION METHOD AND DEVICE USING THE SAME

CLAIM FOR PRIORITY

This application claims priority to Korean Patent Application No. 10-2011-0132209 filed on Dec. 9, 2011 in the Korean Intellectual Property Office (KIPO), the entire contents of which are hereby incorporated by reference.

BACKGROUND

1. Technical Field

Example embodiments of the present invention relate in general to the field of device-to-device (D2D) group communication and more specifically to a D2D group communication method and a device using the same.

2. Related Art

Recently, the number of times of overload occurring in a mobile communication network has increased with an increase in the use of applications that transmit/receive a large volume of data using a smart phone on the move. Thus, the occurrence of a network failure and the degradation of quality of service (QoS) are seriously problematic.

As a solution for these problems, technology for providing D2D communication with an adjacent device located in the same cell or a peripheral cell within a radius of 1 to 2 km in a mobile communication system is being considered.

D2D communication is a communication scheme for performing direct data transmission/reception between two adjacent devices without involving a base station. That is, D2D communication technology is technology in which data is directly exchanged between devices through a D2D wireless link without involving the base station after the D2D wireless link is set up through a mobile communication radio interface using a mobile communication frequency band between adjacent devices.

This D2D communication technology has various advantages. Existing technologies such as wireless fidelity (Wi-Fi) direct, Bluetooth, and Zigbee can support only communication between devices within several hundreds of meters, but the D2D communication technology enables direct communication between devices located within a radius of 1 to 2 km to be performed based on medium/long distance transmission capability provided by a mobile communication radio interface.

Also, it is possible to reduce a load on a network because communication between adjacent devices does not involve the network. In addition, only low-rate data transmission is possible when adjacent devices located in a cell boundary region communicate with each other via a base station. However, it is possible to provide users with a service of further improved performance because high-rate data transmission is possible in a better signal environment when adjacent devices directly communicate with each other.

Additionally, although each device should maintain high transmission power that reaches the base station when the adjacent devices located in the cell boundary region perform communication via the base station, a lifespan of a battery can be prolonged because transmission power is significantly reduced when direct communication between the devices is performed.

This D2D communication is not limited to only communication between two devices, and group communication to which three or more devices join is possible. However, particulars for supporting group communication in D2D communication have not been proposed up to now.

SUMMARY

Accordingly, example embodiments of the present invention are provided to substantially obviate one or more problems due to limitations and disadvantages of the related art.

Example embodiments of the present invention provide a group communication method for use in a device that performs D2D group communication with two or more devices belonging to the same D2D group.

Example embodiments of the present invention provide a D2D group communication control method.

Example embodiments of the present invention provide a device that performs D2D group communication with two or more devices belonging to the same D2D group.

Example embodiments of the present invention provide a D2D group communication control apparatus.

In some example embodiments, a D2D group communication method for use in a device that communicates with two or more devices belonging to the same D2D group, includes: transmitting a scheduling request for D2D group communication to a base station; receiving first radio resource information for a status report of D2D data to be transmitted from the base station; transmitting a D2D buffer status report to the base station through a first radio resource; receiving second radio resource information including D2D resource allocation information necessary for the D2D group communication from the base station; and transmitting D2D user data and control information for the D2D group communication including a D2D group identifier (ID) as a device ID and the D2D resource allocation information necessary for the D2D group communication to two or more communication partner devices belonging to the D2D group.

In the D2D group communication method, the second radio resource information and the control information for the D2D group communication may be transmitted through a downlink (DL) control channel being used for transmission between the base station and the device.

In addition, the D2D user data may be transmitted using a radio resource indicated by the D2D resource allocation information necessary for the D2D group communication, and the D2D user data may be transmitted through a DL data channel being used for transmission between the base station and the device.

The second radio resource information and the control information for the D2D group communication may include information regarding modulation and coding schemes to be used for the D2D group communication by the device.

The scheduling request for the D2D group communication may be transmitted through an uplink (UL) control channel being used for transmission between the base station and the device.

The first radio resource information may be received through a DL control channel being used for transmission between the base station and the device.

In other example embodiments, a D2D group communication method for use in a device that communicates with two or more devices belonging to the same D2D group, includes: transmitting a scheduling request for D2D group communication to a base station; receiving first radio resource information for a status report of D2D data to be transmitted from the base station; transmitting a D2D buffer status report to the base station using a first radio resource; and receiving second radio resource information including a D2D group ID as a device ID and D2D resource allocation information necessary for the D2D group communication from the base station, wherein a D2D resource necessary for the D2D group communication is set to a UL data channel being used for transmission between the base station and the device.

In addition, the second radio resource information may include information regarding the device that transmits D2D group data.

The D2D group communication method may further include: transmitting D2D user data to two or more communication partner devices belonging to the D2D group through a UL data channel for transmission between the base station and the device, which is a D2D resource necessary for the D2D group communication when the device receiving the second radio resource information from the base station is recognized to be a device that transmits D2D group data.

In other example embodiments, a D2D group communication control method includes: receiving a scheduling request for D2D group communication from a device; transmitting first radio resource information for a status report of D2D data to be transmitted by the device to the device; receiving a D2D buffer status report from the device; and generating second radio resource information including D2D resource allocation information necessary for the D2D group communication according to the D2D buffer status report received from the device to transmit the generated second radio source information to the device.

Receiving the scheduling request for the D2D group communication from the device may include: determining to which device a resource for the D2D group communication is first allocated when scheduling requests for the D2D group communication are received from two or more devices; sequentially transmitting the first radio resource information to each of the two or more devices; receiving a D2D buffer status report from the device; and transmitting the second radio resource information to the device.

In still other example embodiments, a device for performing D2D group communication with two or more devices belonging to the same D2D group, includes: a transceiver configured to transmit a scheduling request for the D2D group communication to a base station, transmit a D2D buffer status report to the base station using first radio resource information for a status report of D2D data allocated from the base station, receive second radio resource information including D2D resource allocation information necessary for the D2D group communication from the base station, and provide the received second radio resource information to a controller; and the controller configured to control a transmission/reception operation of the transceiver, generate D2D user data and control information for the D2D group communication including a D2D group ID as a device ID and allocation information of a D2D resource necessary for the D2D group communication using the second radio resource information, and control the transceiver to transmit the D2D user data and the control information to two or more communication partner devices belonging to the same D2D group, wherein the D2D resource necessary for the D2D group communication is set to a DL data channel being used for transmission between the base station and the device.

In still other example embodiments, a device for performing D2D group communication with two or more devices belonging to the same D2D group, includes: a transceiver configured to transmit a scheduling request for the D2D group communication to a base station, transmit a D2D buffer status report to the base station using first radio resource information for a status report of D2D data allocated from the base station, receive second radio resource information including a D2D group ID as a device ID and D2D resource allocation information necessary for the D2D group communication from the base station, and provide the received second radio resource information to a controller; and the controller configured to control a transmission/reception operation of the transceiver and control the transceiver to transmit D2D user data to two or more communication partner devices belonging to the D2D group through a UL data channel for transmission between the base station and the device, which is a D2D resource necessary for the D2D group communication when the device receiving the second radio resource information from the base station is recognized to be a device that transmits D2D group data, wherein the second radio resource information includes information regarding the UL data channel between the base station and the device to be used for the D2D group communication and information regarding the device that transmits D2D group data.

In still other example embodiments, a D2D group communication control apparatus includes: a radio transceiver configured to receive a scheduling request for D2D group communication from a device, receive a D2D buffer status report from the device, and provide the scheduling request and the D2D buffer status report to a D2D controller; and the D2D controller configured to allocate a first radio resource for a status report of D2D data to be transmitted by the device for the scheduling request of the device, generate second radio resource information including D2D resource allocation information necessary for the D2D group communication according to the D2D buffer status report received from the device, and control the radio transceiver to transmit the second radio resource information to the device.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
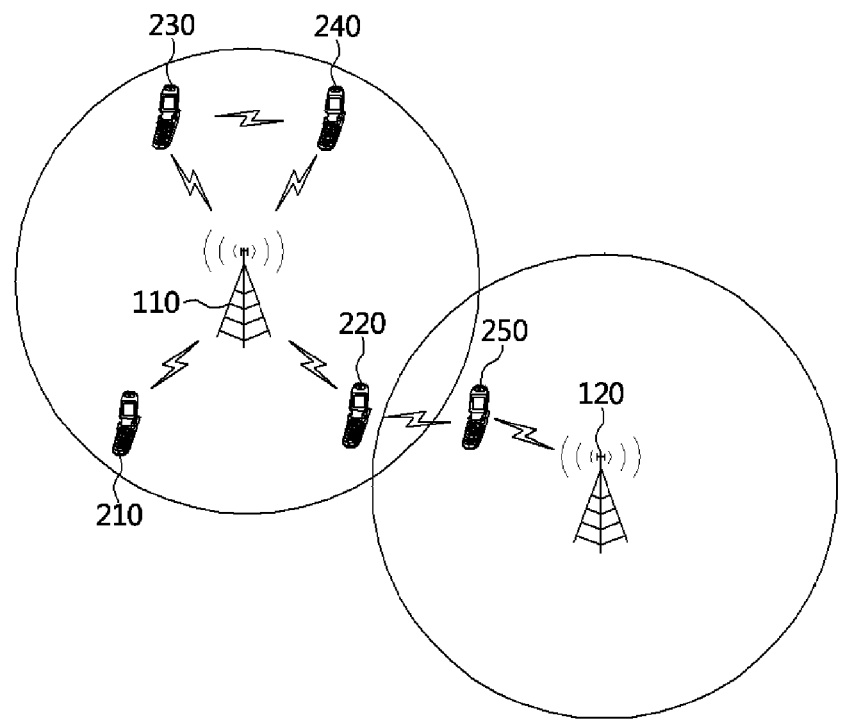
FIG. 1 is a conceptual diagram illustrating a concept of D2D communication.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The term "device" used herein may be referred to as a mobile station (MS), user equipment (UE), user terminal (UT), wireless terminal, access terminal (AT), subscriber unit, subscriber station (SS), wireless device, wireless communication device, wireless transmit/receive unit (WTRU), mobile node, mobile, or other terms. Various embodiments of a device may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or devices having a combination of such functions, but are not limited thereto.

The term "base station" used herein generally denotes a fixed or mobile point that communicates with a device, and may be referred to as a Node-B, evolved Node-B (eNB), base transceiver system (BTS), access point, relay, femto-cell, and other terms.

Hereinafter, preferred embodiments of the present invention will be described in more detail with reference to the accompanying drawings. To facilitate the entire understanding of the invention, the same reference numerals in the drawings denote the same elements, and repetitive description of the same elements is omitted.

FIG. 1 is a conceptual diagram illustrating a concept of D2D communication.

Referring to FIG. 1, a cellular communication network including a first base station 110 and a second base station 120 is illustrated.

It can be seen that device 1 (210) and device 2 (220) belonging to a cell generated by the first base station perform communication using a general connection link through the first base station, but device 3 (230) and device 4 (240) directly perform mutual data transmission/reception without involving the base station despite belonging to the first base station.

This D2D communication can be effectively used in various examples. For example, the D2D communication can be used for a local media server and the like that provide a large volume of materials to visitors attending a concert and the like.

Referring again to FIG. 1, it can be seen that a D2D link can be connected not only between devices for which serving cells are the same, but also between devices for which serving cells are different. That is, in FIG. 1, device 2 (220) belonging to the first base station 110 performs D2D communication with device 5 (250) belonging to the second base station 120.

This D2D communication includes D2D communication based on a centralized control scheme and D2D communication based on a distributed control scheme.

The D2D communication based on the centralized control scheme is a scheme in which a device desiring to communicate with another device requests a central node (a base station in a cellular network) to set up a link and the central node enables communication between the devices to be performed by allocating radio resources with which the two devices can perform direct communication when a communication partner device, that is, the other device, is located around the device.

Here, an operation occurring in the device is usually managed by the central node, and radio resources allocated for a cellular link or another D2D link can be reused for D2D communication.

On the other hand, the D2D communication based on the distributed control scheme is a scheme in which a link is set up by the distributed control scheme through a direct signal exchange between devices independent of one central control node, and a direct data exchange with a peripheral device is performed using the set-up link.

A group communication method according to an example embodiment of the present invention can be more suitable for the centralized control scheme than the distributed control scheme.

Figure 2:
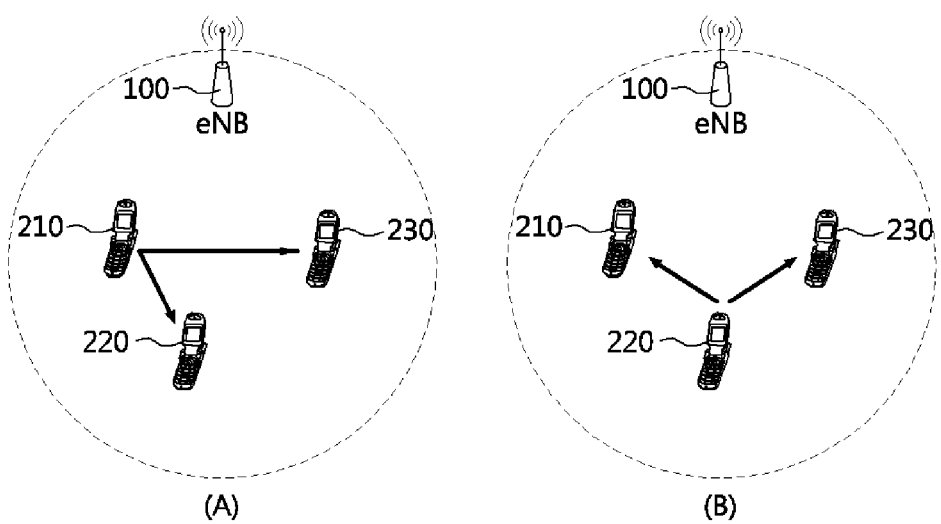
FIG. 2 is a conceptual diagram illustrating group communication between devices within a D2D group according to an example embodiment of the present invention.

FIG. 2 is a conceptual diagram illustrating group communication between devices within a D2D group according to an example embodiment of the present invention.

One group that performs D2D group communication can be configured to include three or more devices. Each device within the group can transmit data to other member devices within the group, and all group members can simultaneously receive the transmitted data, for example, as in communication using radio equipment.

Referring to FIG. 2, it can be seen that the case of FIG. 2(a) is a situation in which device 1 (210) transmits data, and both of device 2 (220) and device 3 (230), which are the remaining members within the group, receive the data transmitted by device 1 (210). On the other hand, it can be seen that the case of FIG. 2(b) is a situation in which device 2 (220) transmits data, and both of device 1 (210) and device 3 (230), which are the remaining members within the group, receive the data transmitted by device 2 (220).

As described above, a data transmitter within the D2D group transmits data using a representative group ID for group members based on broadcast characteristics of a radio zone without iteratively transmitting data to individual group members. Communication within the group can be performed when all members pre-sharing the group ID receive data including the group ID. Each member within the group can transmit data to group members at any time.

On the other hand, D2D communication using a mobile communication frequency band can share a radio resource used by a base station. In this case, there may be a problem in that interference is caused due to the use of the same radio resource as in the base station. In order to solve this problem, a scheduler of the base station can be responsible for determining a time of D2D data transmission/reception between devices and allocating resources necessary for transmission/reception.

In the present invention, it is assumed that devices are connected to the base station in a cell to which the devices belong and their D2D communication is controlled by the base station. That is, the example embodiment of the present invention follows the centralized control scheme in the D2D communication method as described above.

Because D2D communication methods according to example embodiments of the present invention are based on an existing mobile communication system as described above, a process in which a mobile device and a base station transmit/receive data will be first described before the description of the example embodiments of the present invention.

Figure 3:
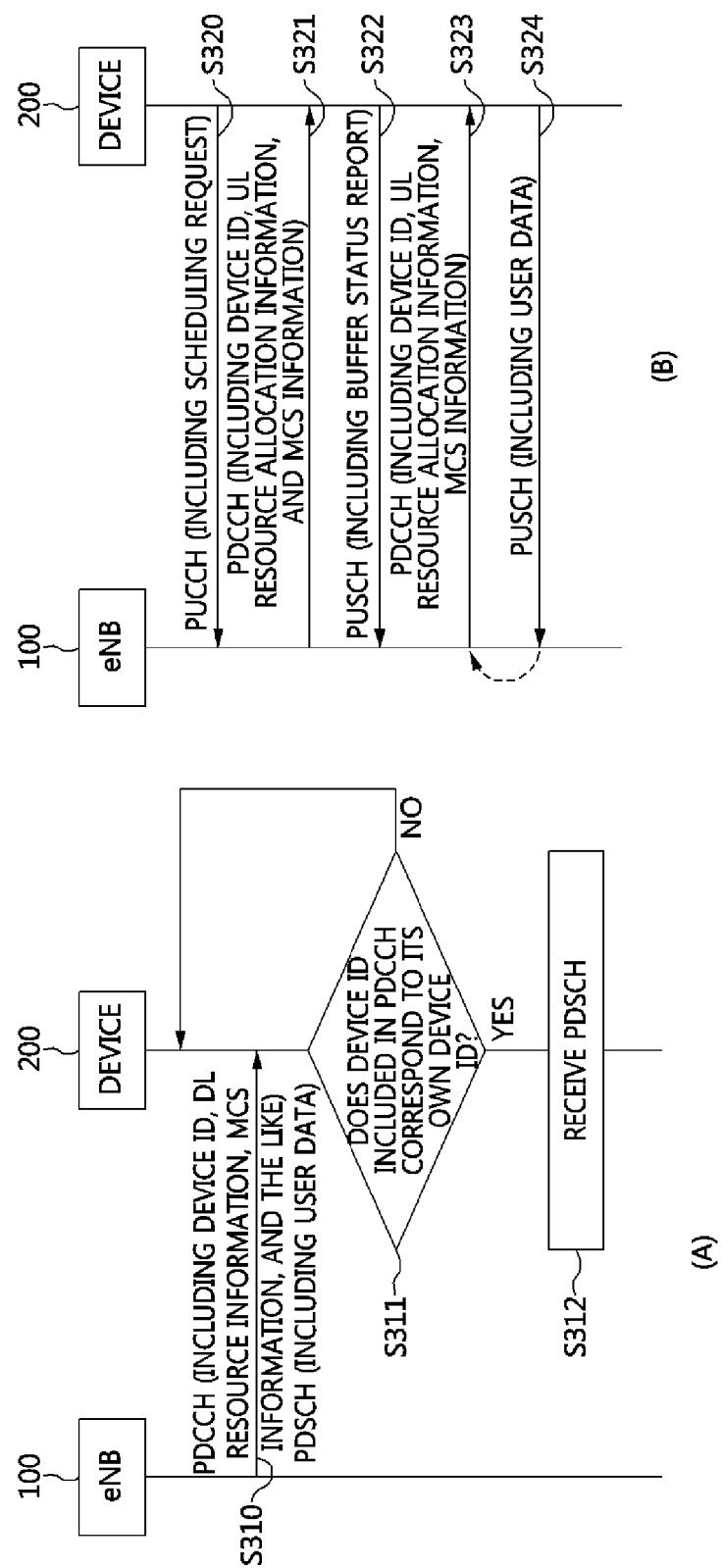
FIG. 3 is a sequence diagram illustrating a process in which a mobile device transmits/receives data to/from a base station through DL and UL resources in a mobile communication system.

FIG. 3 is a sequence diagram illustrating a process in which a mobile device transmits/receives data to/from a base station through DL and UL resources in a mobile communication system.

The sequence diagram of FIG. 3(a) illustrated on the left of FIG. 3 illustrates the case in which a base station 100 first generates data to be transmitted to a device 200, and the sequence diagram of FIG. 3(b) illustrated on the right of FIG. 3 illustrates the case in which the device 200 first generates data to be transmitted to the base station 100.

Referring first to FIG. 3(a), when DL data is transmitted from the base station (eNB) 100 to the device 200, the base station 100 also transmits control information such as an ID of a device to receive data through a physical DL control channel (PDCCH), which is a DL control channel, a position and magnitude of a physical DL shared channel (PDSCH), which is a DL data channel necessary for data transmission, and modulation coding scheme (MCS) information for receiving, demodulating, and decoding data to the device 200 (S310). Along with this, the base station transmits actual user data to the device 200 using a corresponding resource of PDSCH, which is a resource designated by PDCCH (S310).

Here, PDSCH is also used to transmit paging information as a main physical channel for unicast transmission, and will be used synonymously with the term "DL data channel" hereinafter. PDCCH is a physical channel to be used to transmit DL control information regarding scheduling necessary to receive PDSCH and transmit a scheduling grant for transmission on a physical UL shared channel (PUSCH), and will be used synonymously with the term "DL control channel" hereinafter. On the other hand, PUSCH is a UL channel for performing a function similar to that of PDSCH, and will be used synonymously with the term "UL data channel" hereinafter.

Upon receipt of control information through PDCCH, the device 200 determines whether or not a device ID of control information included in PDCCH corresponds to its own device ID (S311). If the determination result indicates that the device ID of the control information corresponds to its own device ID, data transmitted by the base station is received through PDSCH indicated by the control information (S312).

Next, the case in which the device desires to transmit UL data to the base station will be described with reference to FIG. 3(b).

When the device 200 should transmit UL data to the base station, the device 200 transmits a scheduling request for requesting resource allocation to the base station 100 through a physical UL control channel (PUCCH) (S320).

Here, PUCCH is a physical channel to be used to transmit a hybrid automatic repeat request (HARQ) acknowledgement for notifying the base station of whether or not a DL transmission block has been successfully received, a channel status report for supporting scheduling according to a DL channel, and a scheduling request for requesting resource allocation when UL data or the like is transmitted. Hereinafter, PUCCH is used synonymously with the term "UL control channel."

The base station 100 receiving the scheduling request from the device 200 allocates a UL resource of PUSCH necessary to receive a buffer status report of a device necessary to sense an amount of data desired to be transmitted by the device 200, and transmits resource allocation information to the device 200 through PDCCH (S321). Here, PDCCH to be transmitted by the base station 100 to the device 200 includes a device ID, UL resource allocation information, MCS information, and the like.

The device receiving the UL resource allocation information necessary to transmit the buffer status report to the base station through PDCCH transmits the buffer status report indicating an amount of data desired to be transmitted to the base station using the allocated UL PUSCH resource (S322). The base station 100 receives the buffer status report from the device 200, allocates resources corresponding to an amount of receivable data at a corresponding point in time in consideration of an amount of data described in the report, and transmits information regarding a UL PUSCH resource allocated through PDCCH to the device (S323).

The device 200 transmits actual user data corresponding to an amount of resources permitted by the base station to the base station using the allocated UL PUSCH resource by referring to the UL PUSCH resource allocated from the base station (S324).

Uplink resource allocation of the base station and data transmission of the device can be iterated until all data corresponding to an amount described in the buffer status report is transmitted.

The present invention proposes a group communication method in D2D communication based on the above-described data transmission method between a base station and a device. According to an example embodiment of the present invention, members within the group transmit data using UL or DL resources of the mobile communication system, a source device among devices within a group comprising three or more devices broadcasts data, and all other members receive the broadcast data.

Accordingly, the present invention has the following characteristics.

The present invention relates to communication between devices within a group comprising three or more devices.

In the present invention, member devices of a D2D group are connected to a base station and controlled by the base station in terms of a point in time necessary for data transmission and resource allocation.

According to the present invention, each member within the group can transmit data to group members at any time.

In data transmission to the members within the group according to the present invention, a group ID representing the group can be used, and data transmission using the group ID can be received by all members.

The group ID can be pre-delivered by the base station or the like to the members within the group and shared between the members.

According to the present invention, a group D2D communication method can have the following two processes.

1) Measurement of Wireless Link of D2D Communication Between Group Members

2) Group Data Transmission Using DL or UL Resources

Hereinafter, specific embodiments of the two processes will be described.

Measurement of Wireless Link of D2D Communication Between Group Members

In the case of D2D group communication according to the present invention as described above, each member within the group can transmit data to group members at any time. In addition, data transmitted by a source member is received by all other members within the group. Accordingly, it is preferable that each group member determine a necessary optimum output during data transmission and MCS by measuring statuses of wireless links to the remaining members.

Figure 4:
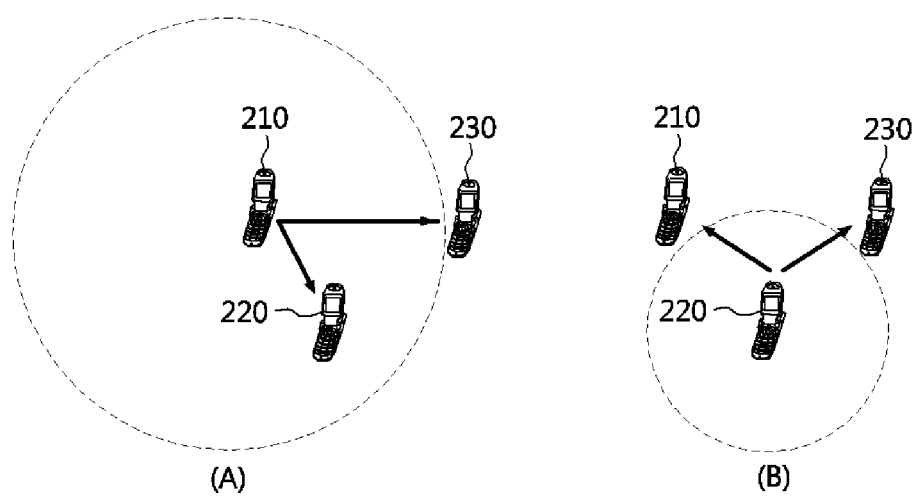
FIG. 4 is a conceptual diagram of an adaptive transmission technique reflecting a wireless link measurement result of D2D communication between group members according to an example embodiment of the present invention.

FIG. 4 is a conceptual diagram of an adaptive transmission technique reflecting a wireless link measurement result of D2D communication between group members according to an example embodiment of the present invention.

Referring to FIG. 4, it can be seen that although all devices within the group follow the same topology, each device can require a different transmission output according to a relative position with the remaining members and use a different MCS according to a wireless environment.

For example, as illustrated in FIG. 4(a), device 1 (210) can require a higher transmission output when transmitting data to device 3 (230) than when device 2 (220) transmits data to device 3 (230), and use MCS having lower efficiency than device 2 (220). On the other hand, when device 2 (220) transmits data, a relatively low transmission output and MCS having relatively high efficiency can be used. This is because a distance between device 1 and device 3 is greater than a distance between device 2 and device 3 or because a wireless environment is relatively bad.

According to the present invention, each device can adjust a transmission output and MCS so that a communication partner member of a wireless link having a worst reception environment among wireless links to communication partner members can receive correct data by periodically measuring wireless links to other members. Each device stores a wireless link measurement result for a member having a worst reception environment and reports the wireless link measurement result to the base station so that the wireless link measurement result is reflected in resource allocation for data transmission.

Hereinafter, example embodiments of the present invention in which D2D group data is transmitted/received using DL and UL resources to be used for transmission between a base station and a device will be described.

Group Data Transmission Using DL or UL Resources

First, the case in which devices within a group transmit D2D data using DL radio resources to be used for transmission between a base station and the devices will be described.

Figure 5:
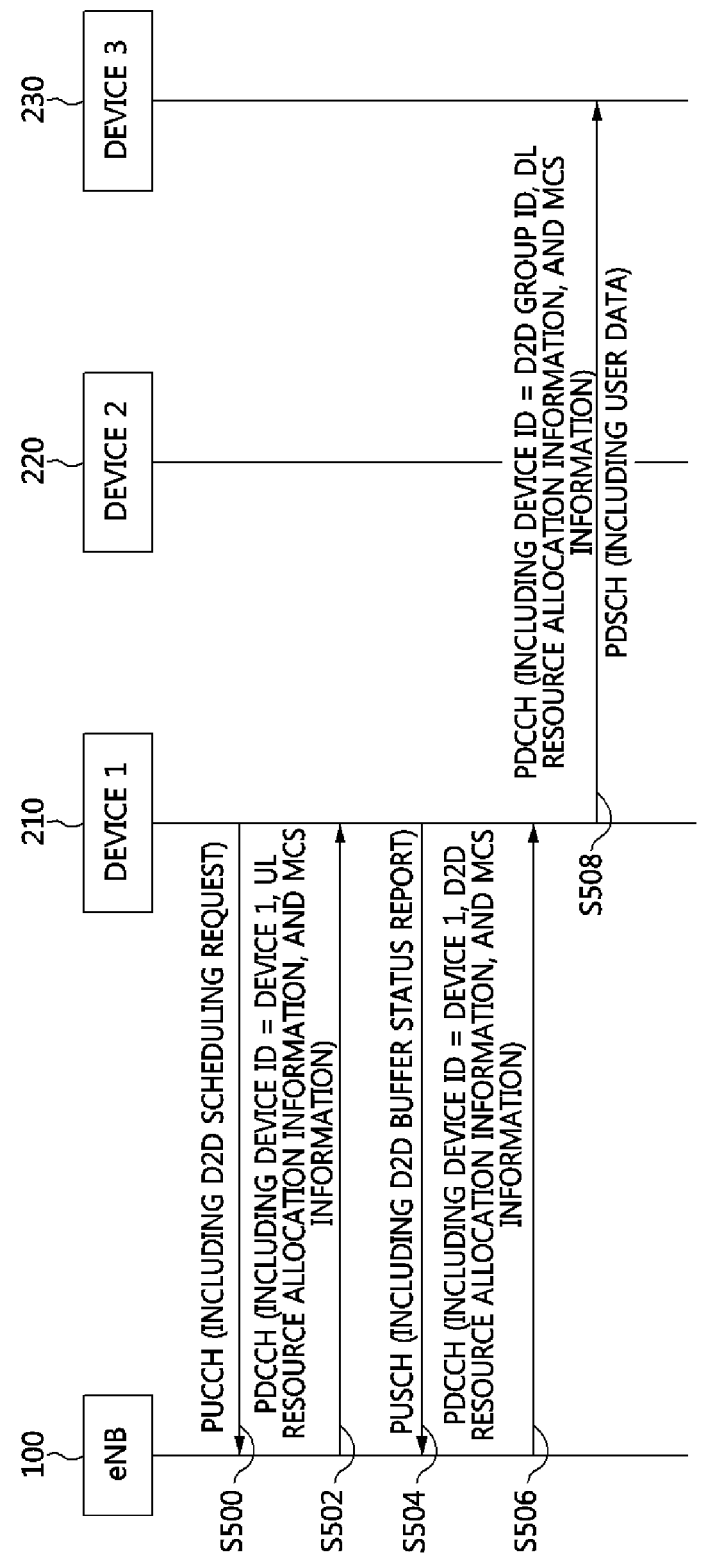
FIG. 5 is a sequence diagram illustrating a flow of messages exchanged between a base station and at least one device in a group data transmission method using a DL radio resource according to an example embodiment of the present invention.

FIG. 5 is a sequence diagram illustrating a flow of messages exchanged between a base station and at least one device in a group data transmission method using a DL radio resource according to an example embodiment of the present invention.

In FIG. 5, device 1 (210) desiring to transmit data to other devices within the group transmits a D2D scheduling request to the base station 100 so as to request the base station to allocate a DL radio resource to be used for data transmission before the data transmission (S500). Here, the D2D scheduling request can be transmitted to the base station through a channel such as PUCCH, which is an uplink control channel.

The base station 100 receiving the D2D scheduling request allocates a UL resource necessary to receive a buffer status report from device 1 (210) so as to sense an amount of data that device 1 (210) desires to transmit, and transmits information regarding the allocated resource to device 1 (210) through PDCCH, which is a DL control channel (S502). Here, PDCCH can include information indicating that a device ID indicates device 1, UL resource allocation information necessary for device 1 to transmit a buffer status report, MCS information, and the like.

Device 1 (210) receiving radio resource allocation information for reporting a status of D2D data to be transmitted from the base station through a DL control channel transmits a D2D buffer status report indicating an amount of data desired to be transmitted to the base station 100 using PUSCH (S504).

The base station 100 receiving the D2D buffer status report allocates a DL radio resource to be used for D2D transmission by device 1 in consideration of the amount of data described in the D2D buffer status report, and transmits the allocated resource and the MCS information regarding modulation and coding and the like to be used by device 1 for D2D transmission to device 1 (S506).

In steps S502 and S506, it can be seen that a device ID used in control information, that is, PDCCH, is used to indicate a device to transmit data, that is, device 1.

Device 1 (210) receiving the DL resource and the MCS information necessary for D2D group data transmission from the base station 100 performs modulation and coding according to the MCS information. Thereafter, device 1 (210) loads D2D user data on a resource of PDSCH, which is a DL data channel allocated by the base station, and transmits the user data to device 2 (220) and device 3 (230), which are group members (S508).

Here, device 1 (210) also transmits PDCCH including control information for the data to be transmitted through PDSCH (S508). Here, a D2D group ID representing a D2D group is set in a device ID, which is information included in PDCCH, and all members of the D2D group receiving PDCCH can receive data delivered through PDSCH. That is, an important feature of the present invention is that a D2D group ID is used instead of an individual device ID as a device ID within the control information in step S508 unlike steps S502 and S506.

As described with reference to FIG. 5, each member within the group can transmit data to group members at any time according to the example embodiment of the present invention. Accordingly, there may be a problem in that a collision occurs when many devices within the group simultaneously transmit data.

Figure 6:
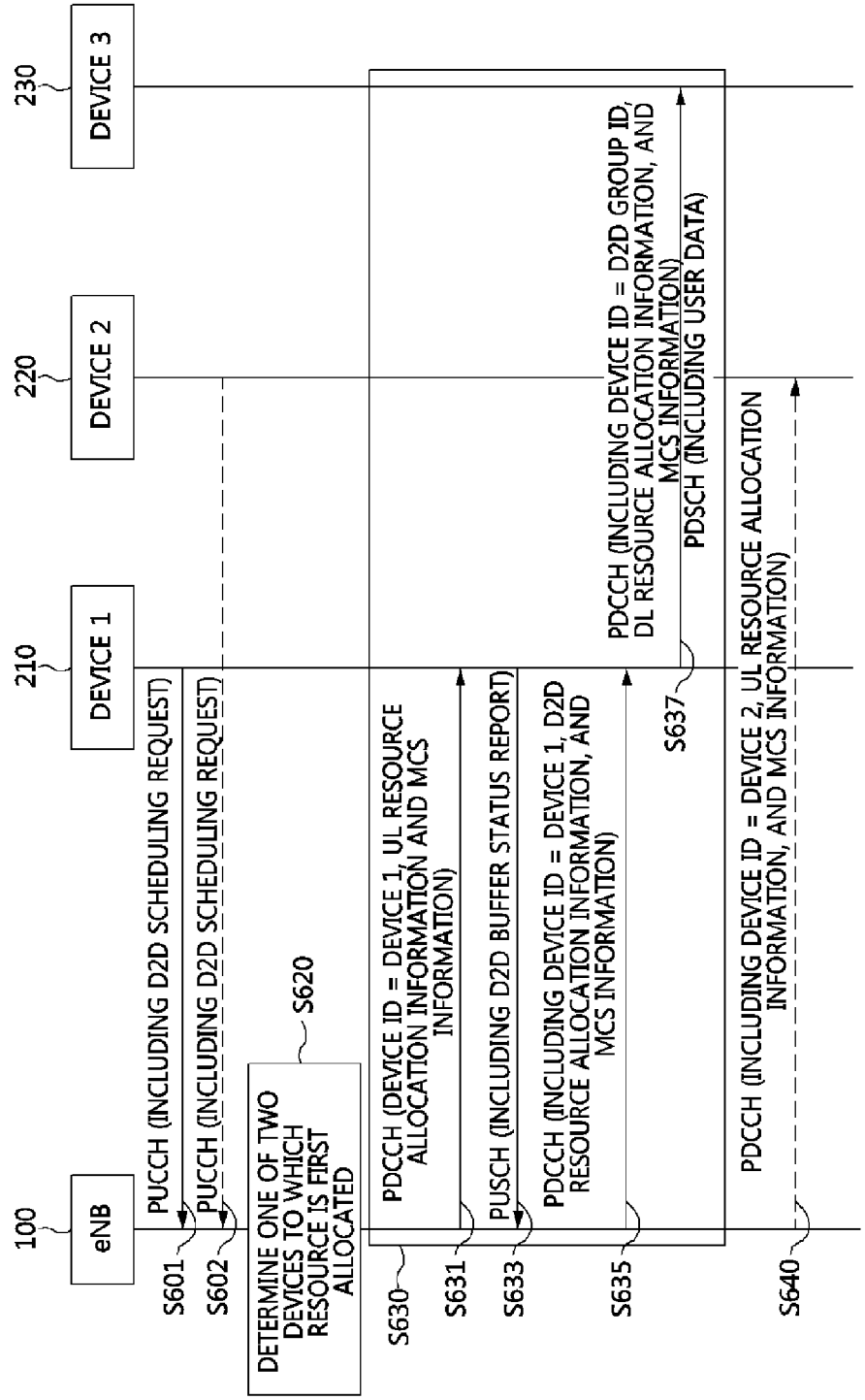
FIG. 6 is a sequence diagram illustrating a message flow between a device and a base station when a transmission collision is avoided through a group data transmission method using a DL radio resource according to an example embodiment of the present invention.

FIG. 6 is a sequence diagram illustrating a message flow between a device and a base station when a transmission collision is avoided through a group data transmission method using a DL radio resource according to an example embodiment of the present invention.

Two or more devices belonging to the same D2D group may simultaneously transmit data to other devices within the group. Referring to FIG. 6, for example, when the base station 100 substantially simultaneously receives scheduling requests from device 1 (210) and device 2 (220) (S601 and S602), the base station 100 determines which of the two devices is first allocated a resource for D2D communication (S620).

A subsequent procedure (S630 and S640) in FIG. 6 is a procedure in which a resource is determined to be first allocated to device 1 (210). That is, a procedure (S630) of D2D resource allocation and group communication for device 1 (210) is first performed. Subsequently, a procedure (S640) of D2D resource allocation and group communication for device 2 (220) is performed.

The procedure in which the base station allocates a resource for D2D communication to the device and performs D2D group communication is the same as the procedure described in FIG. 5.

That is, the base station 100 allocates a UL resource necessary to receive a buffer status report from device 1 (210) so as to sense an amount of data that device 1 (210) desires to transmit, and transmits information regarding the allocated resource to device 1 (210) through PDCCH, which is the DL control channel (S631). Device 1 transmits the D2D buffer status report indicating the amount of data that device 1 desires to transmit to the base station 100 using PUSCH (S633).

The base station 100 receiving the D2D buffer status report allocates a DL radio resource to be used for D2D transmission by device 1 in consideration of the amount of data described in the D2D buffer status report, and transmits the allocated resource and the MCS information regarding modulation and coding and the like to be used for the D2D transmission by device 1 to device 1 (S635).

Device 1 (210) receiving the DL resource necessary for D2D group data transmission and the MCS information from the base station performs modulation and coding according to the MCS information. Device 1 (210) loads user data on a resource of PDSCH, which is a DL data channel allocated by the base station, and transmits the user data to D2D group members (S637). Here, device 1 (210) also transmits PDCCH including control information for the data to be transmitted through PDSCH (S637).

The same steps as in the procedure (S630) of D2D resource allocation and group communication for device 1 are also iterated within a subsequent procedure (S640) of D2D resource allocation and group communication for device 2.

In order to solve a problem of a transmission collision when many devices desire to simultaneously transmit data to other devices within the group as described above, the devices transmit D2D scheduling requests to the base station before data transmission and the base station sequentially allocates a resource to one device of the devices requesting D2D scheduling once as in the example embodiments of the present invention as described with reference to FIG. 6.

Next, the case in which the devices within the group transmit data using a UL radio resource used by the base station in the related art will be described.

Group Data Transmission Using UL Radio Resource

Figure 7:
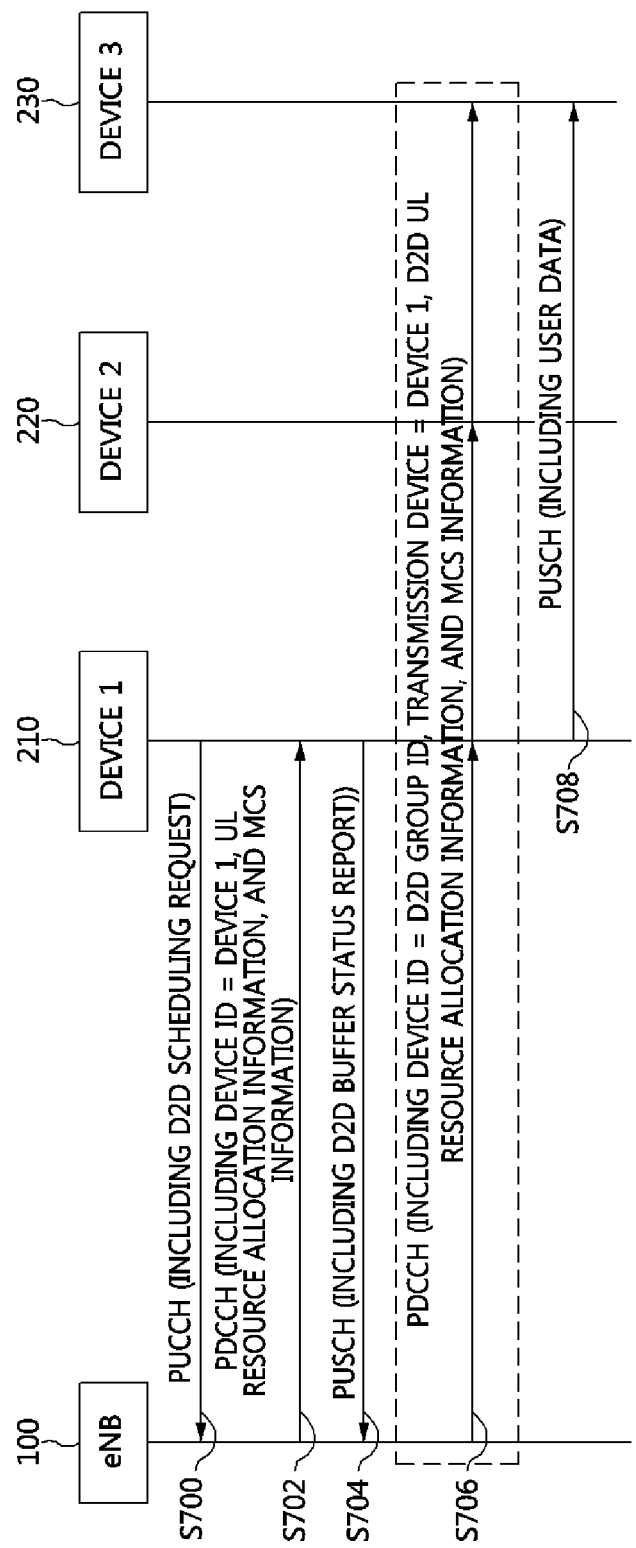
FIG. 7 is a sequence diagram illustrating a flow of messages exchanged between a base station and at least one device in a group data transmission method using a UL radio resource according to an example embodiment of the present invention.

FIG. 7 is a sequence diagram illustrating a flow of messages exchanged between a base station and at least one device in a group data transmission method using a UL radio resource according to an example embodiment of the present invention.

Referring to FIG. 7, device 1 (210) desiring to transmit data to other devices within the group transmits a D2D scheduling request to the base station 100 before data transmission so as to request the base station to allocate a UL radio resource (for example, PUSCH) to be used for the data transmission (S700). Here, the D2D scheduling request can be transmitted to the base station through a channel such as PUCCH, which is a UL control channel being used for transmission between the base station and the device.

The base station 100 receiving the D2D scheduling request allocates a UL resource necessary to receive a buffer status report from the device so as to sense an amount of data that the device desires to transmit, and transmits information regarding the allocated resource to device 1 (210) through PDCCH, which is a DL control channel (S702). Here, PDCCH can include information indicating that the device ID corresponds to device 1, UL resource allocation information necessary for the device to transmit a buffer status report, MCS information, and the like.

Device 1 (210) receiving radio resource allocation information for a status report of D2D data to be transmitted from the base station through a DL control channel transmits the D2D buffer status report indicating an amount of data desired to be transmitted to the base station 100 using PUSCH (S704).

The base station 100 receiving the D2D buffer status report allocates a UL radio resource (for example, PUSCH) to be used by device 1 for D2D transmission in consideration of an amount of data described in the D2D buffer status report, and transmits the allocated resource and the MCS information for demodulation and decoding to be used by device 1 for D2D transmission to all devices within the D2D group through PDCCH, which is a DL physical channel (S706).

Here, control information to be transmitted through PDCCH is delivered to all group members to receive data. Accordingly, a device ID included in the control information of PDCCH is set to a D2D group ID representing a D2D group, not an ID of a device requesting transmission.

In addition, the base station indicates a destination device of control information to be transmitted through PDCCH, for example, as in "Transmission Device=Device 1." Thereafter, the base station indicates an actual device to transmit data through PUSCH. Accordingly, members within the D2D group receiving the PDCCH information from the base station can recognize which device attempts transmission.

In other words, because a group ID is included in PDCCH transmitted by the base station in the example embodiment of FIG. 7, all group members can receive PDCCH and all the members receiving PDCCH can recognize that device 1 (210) attempts transmission from a transmission device ID included in control information included in PDCCH.

Device 1 receiving a UL PDSCH resource necessary for D2D group data transmission and MCS information from the base station loads user data on the UL PUSCH allocated by the base station to transmit the user data to a group member after performing modulation and coding according to the information (S708).

As described with reference to FIG. 7, devices within the D2D group can transmit data using PUSCH, which is a UL radio resource used for transmission between the base station and the device. As described above, data transmission (S708) through PUSCH, which is a UL data channel, is different from data transmission (the example embodiment illustrated in FIG. 6) through DL PDSCH in that control information as in PDCCH is not transmitted along with the data transmission.

Accordingly, in order to correctly receive data transmitted through UL PUSCH, a procedure such as step S706 is necessary for members of the D2D group to acquire MCS information and an allocation position and magnitude of a UL PUSCH resource to be transmitted through UL PUSCH.

A source device desiring to transmit D2D group communication data can determine whether or not to transmit D2D data through a device ID and a transmission device ID included in PDCCH control information transmitted from the base station in steps S702 to S706. Accordingly, it is possible to prevent a data transmission collision even in the D2D group communication method using a UL radio resource illustrated in FIG. 7.

Figure 8:
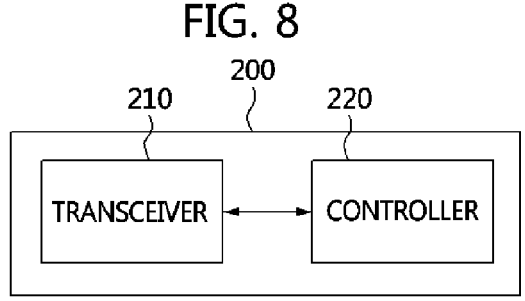
FIG. 8 is a block diagram illustrating a configuration of a device according to an example embodiment of the present invention.

FIG. 8 is a block diagram illustrating a configuration of a device according to an example embodiment of the present invention.

Referring to FIG. 8, the device according to the example embodiment of the present invention can be configured to include a transceiver 210 and a controller 220.

According to the example embodiment of the present invention, the transceiver 210 is basically responsible for transmitting and receiving data to and from the base station and other devices according to control of the controller 220. The transceiver 210 also transmits a scheduling request for D2D group communication to the base station, transmits a D2D buffer status report to the base station using first radio resource information for a status report of D2D data allocated from the base station, and receives second radio resource information including D2D resource allocation information necessary for D2D group communication from the base station to provide the controller with the second radio resource information.

According to the example embodiment of the present invention, the controller 220 controls a transmission/reception operation of the transceiver, and generates D2D user data and control information for D2D group communication including a D2D group ID as a device ID and D2D resource allocation information necessary for the D2D group communication. The controller 220 also controls the transceiver to transmit the generated control information for the D2D group communication and the generated D2D user data to two or more communication partners belonging to the same D2D group.

Here, the D2D resource necessary for the D2D group communication can be set to a DL data channel, for example, PDSCH, being used for transmission between the base station and the device.

According to another example embodiment of the present invention, the transceiver 210 performs a function of transmitting a scheduling request for D2D group communication to the base station, transmitting a D2D buffer status report to the base station using first radio resource information for a status report of D2D data allocated from the base station, and providing the D2D buffer status report to the controller 220.

In addition, according to another example embodiment of the present invention, the controller 220 controls the transceiver to transmit D2D user data to two or more communication partner devices belonging to the D2D group through a UL data channel for transmission between the base station and the device, which is a D2D resource necessary for D2D group communication, if the device receiving second radio resource information including a D2D group ID as a device ID and D2D resource allocation information necessary for D2D group communication is recognized to be a device that transmits D2D group data.

Here, a D2D resource necessary for D2D group communication can be set to a UL data channel, for example, PUSCH, being used for transmission between the base station and the device.

Figure 9:
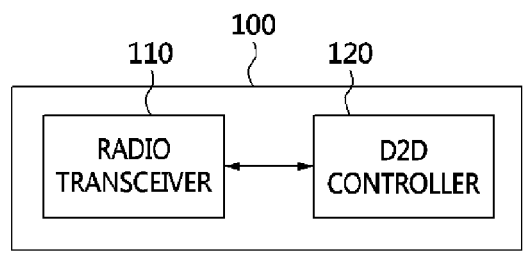
FIG. 9 is a block diagram illustrating a configuration of a D2D group communication control apparatus according to an example embodiment of the present invention.

FIG. 9 is a block diagram illustrating a configuration of a D2D group communication control apparatus according to an example embodiment of the present invention.

An example embodiment of the D2D group communication control apparatus according to the present invention may be a base station.

Referring to FIG. 9, the D2D group communication control apparatus according to the present invention can include a radio transceiver 110 and a D2D controller 120.

The transceiver 110 is basically responsible for wireless transmission/reception to/from a device according to control of the controller 120. The transceiver 110 also receives a scheduling request for D2D group communication, a D2D buffer status report, and the like from the device, and provides the scheduling request, the D2D buffer status report, and the like to the D2D controller 120.

The controller 120 allocates first radio resource information for a status report of D2D data to be transmitted by the device for the scheduling request of the device, and generates second radio resource information including D2D resource allocation information necessary for D2D group communication according to the D2D buffer status report received from the device. The controller 120 also controls the transceiver 110 to transmit the first radio resource information and the second radio resource information to the device. Here, the second radio resource information can be transmitted using a DL control channel, for example, PDCCH, to be used between the base station and the device.

According to an example embodiment of the present invention, a resource allocated for D2D group communication can be set to a DL data channel, for example, PDSCH, being used for transmission between the base station and the device. In addition, the second radio resource information including a device ID of a transmission device can be transmitted to a transmission device.

According to another example embodiment of the present invention, a resource allocated for D2D group communication can be set to a UL data channel, for example, PUSCH, being used for transmission between the base station and the device. Here, the second radio resource information including a D2D group ID as a device ID can be transmitted to all devices within the D2D group.

Figure 10:
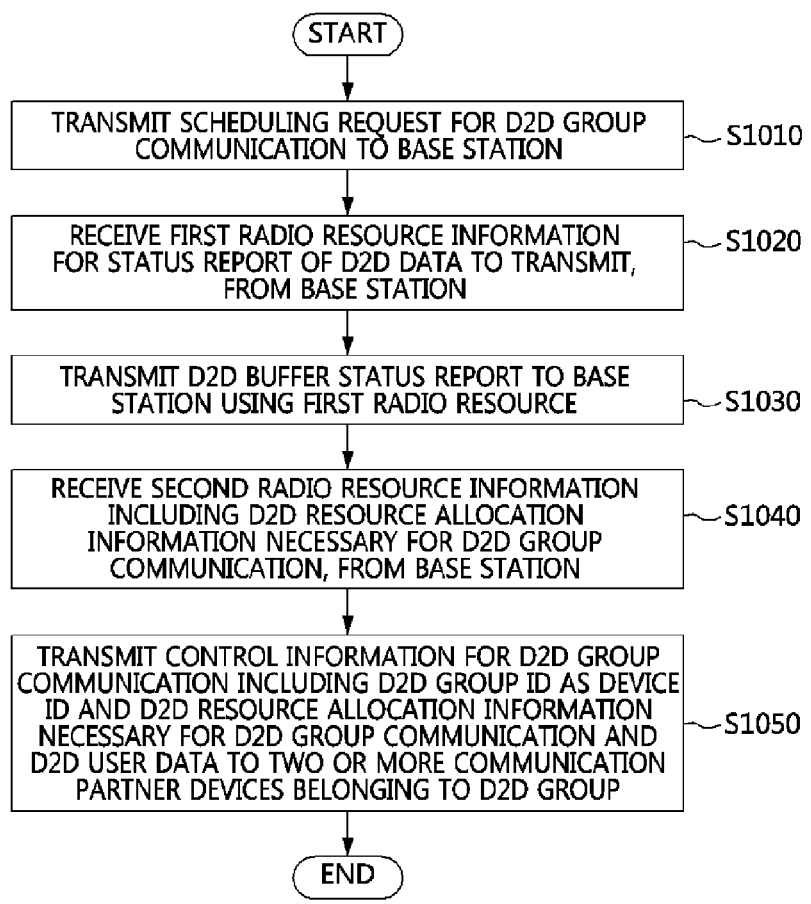
FIG. 10 is a flowchart illustrating a detailed operation of a D2D group communication method according to an example embodiment of the present invention.

FIG. 10 is a flowchart illustrating a detailed operation of a D2D group communication method according to an example embodiment of the present invention.

The flowchart of the operation of FIG. 10 illustrates the case in which a DL data channel, for example, PDSCH, used for transmission between the base station and the device is used for the D2D group communication in a detailed sequence of the operation to be performed by the device that performs D2D group communication.

Referring to FIG. 10, the device desiring to perform the D2D group communication transmits a scheduling request for the D2D group communication to the base station (S1010), and receives first radio resource information for a status report of D2D data to transmit, from the base station (S1020).

If the device transmits the D2D buffer status report to the base station through a first radio resource (S1030), the device can receive second radio resource information including D2D resource allocation information necessary for the D2D group communication, from the base station (S1040).

The device receiving the second radio resource information performs the D2D group communication using the second radio resource information. Specifically, the device generates D2D user data and also generates control information for the D2D group communication including a D2D group ID as a device ID and D2D resource allocation information necessary for the D2D group communication. The device transmits D2D user data and related control information to two or more communication partner devices belonging to the same D2D group (S1050). Here, the D2D user data, for example, is transmitted to the two or more communication partner devices through PDSCH, and the related control information is transmitted to the two or more communication partner devices through PDCCH.

Figure 11:
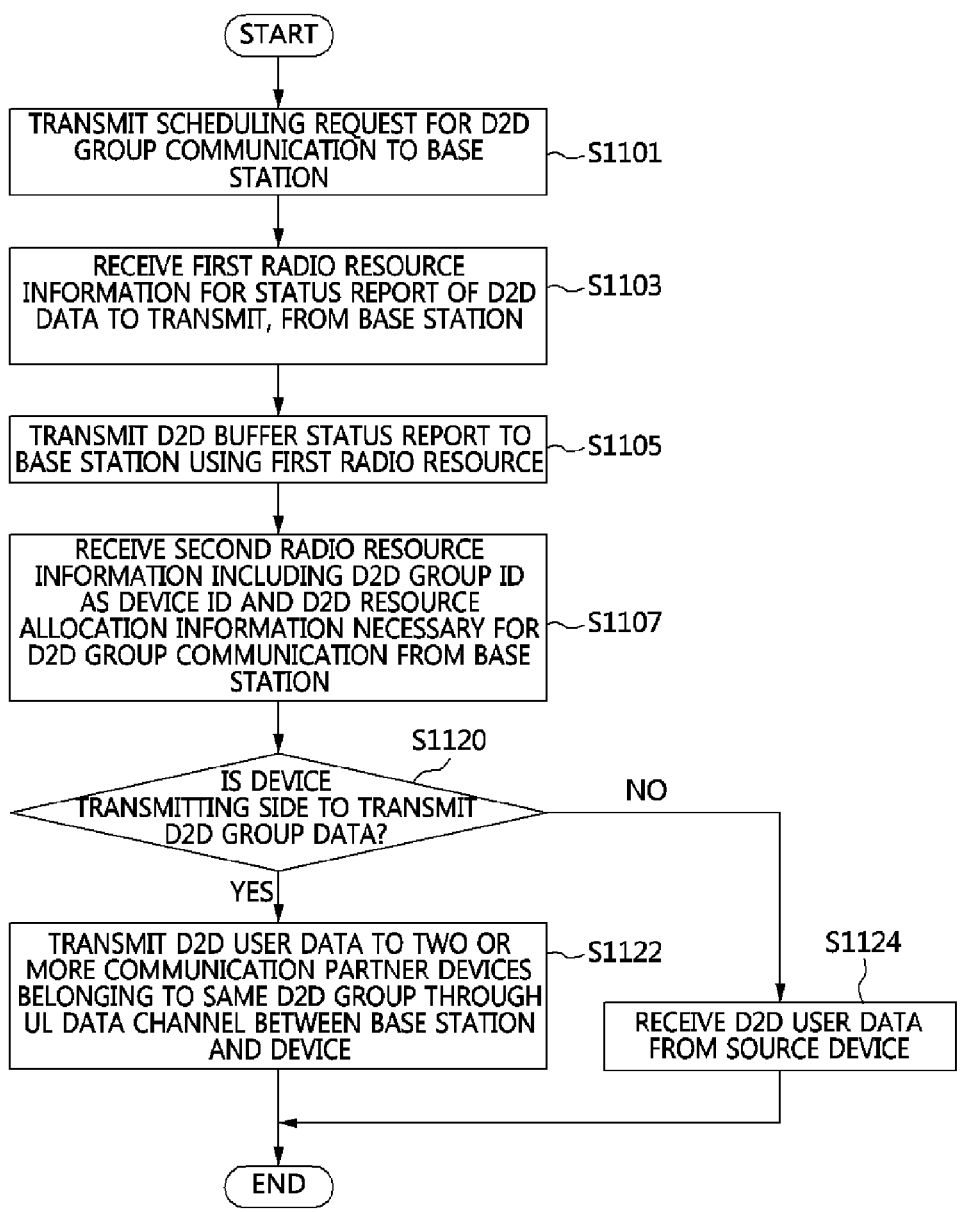
FIG. 11 is a flowchart illustrating a detailed operation of a D2D group communication method according to another example embodiment of the present invention.

FIG. 11 is a flowchart illustrating a detailed operation of a D2D group communication method according to another example embodiment of the present invention.

The flowchart of the operation of FIG. 11 illustrates the case in which a UL data channel, for example, PUSCH, used for transmission between the base station and the device is used for the D2D group communication in a detailed sequence of the operation to be performed by the device that performs the D2D group communication.

Referring to FIG. 11, the device desiring to perform the D2D group communication transmits a scheduling request for the D2D group communication (S1101), and receives first radio resource information for a status report of D2D data to transmit, from the base station (S1103).

If a D2D buffer status report is transmitted to the base station through a first radio resource (S1105), it is possible to receive second radio resource information including a D2D group ID as a device ID and D2D resource allocation information necessary for the D2D group communication from the base station (S1107). Here, the second radio resource information, for example, is transmitted through PDCCH, which is a control channel used for transmission between the device and the base station. In addition, because the device ID of the D2D group is set in the second radio resource information, all devices within the group can receive the second radio resource information.

On the other hand, a D2D resource necessary for the D2D group communication can be set to a UL data channel being used for transmission between the base station and the device.

The device receiving the second radio resource information can recognize whether or not the device is a transmitting side to transmit D2D group data through information regarding a transmission device included in the second radio resource information (S1120).

If the device is determined to be the transmission device, the device transmits D2D user data to a UL data channel, that is, PDSCH, for transmission between the base station and the device, which is a D2D resource necessary for the D2D group communication, to two or more communication partner devices belonging to the same D2D group (S1122). When the device is determined to be a D2D data reception device, not the transmission device, the device receives D2D user data transmitted by a source device (S1124).

The example embodiment of FIG. 11 is different from the example embodiment of FIG. 10 in that a main body, which transmits control information for the D2D group communication (second radio resource information in FIG. 11) to communication partner devices within the group, is a base station, not a transmission device.

Accordingly, the second radio resource information transmitted by the base station in the example embodiment of FIG. 11 includes more information than the second radio resource information of FIG. 10. Because a separate procedure in which the transmission device additionally transmits control information for the D2D group communication to a communication partner device within a group may be omitted in the example embodiment of FIG. 11, the total number of required procedures can be reduced as compared to the example embodiment of FIG. 10.

Figure 12:
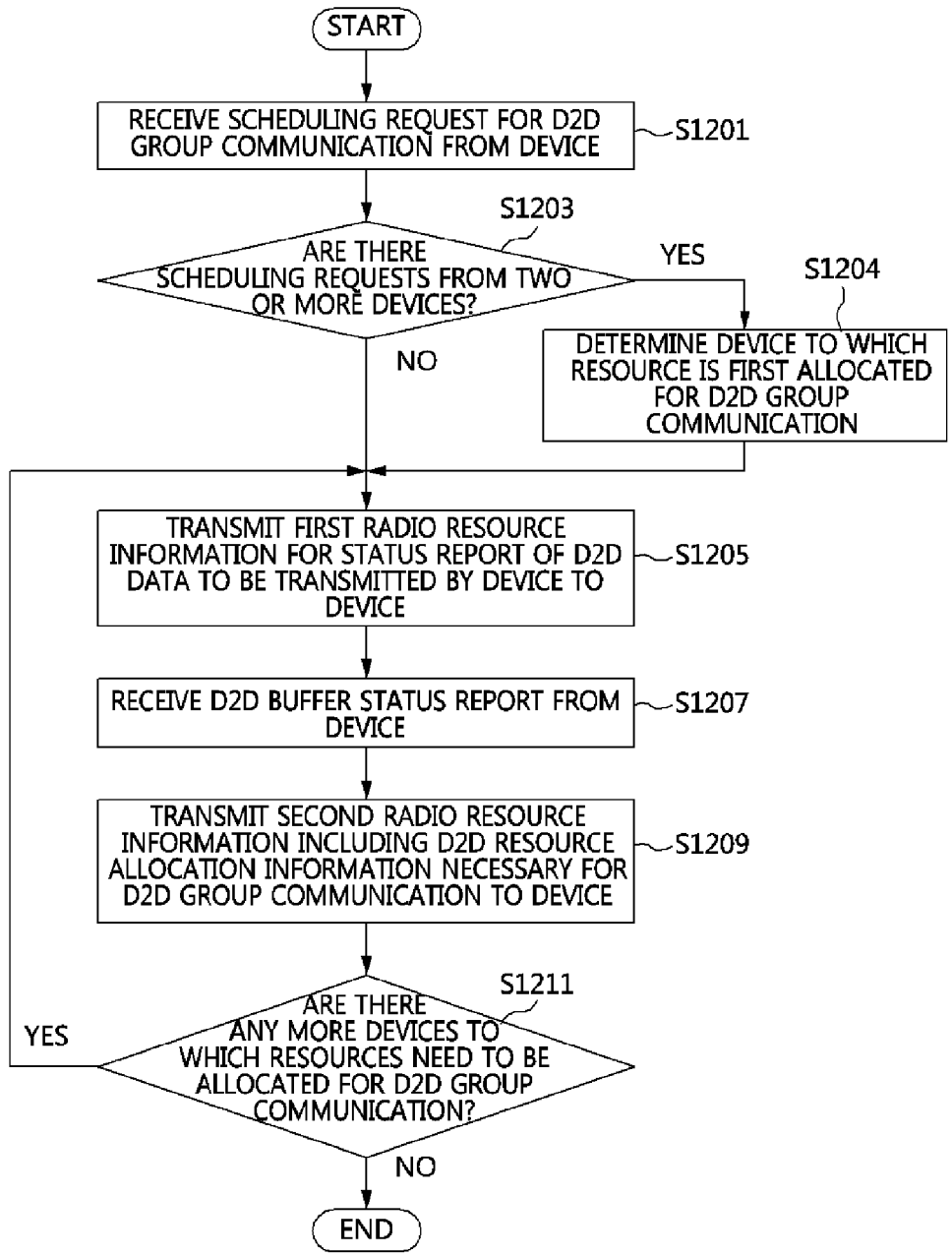
FIG. 12 is a flowchart illustrating a detailed operation of a D2D group communication control method according to an example embodiment of the present invention.

FIG. 12 is a flowchart illustrating an operation of a D2D group communication control method according to an example embodiment of the present invention.

The flowchart of the operation illustrated in FIG. 12 illustrates a detailed sequence of an operation capable of being performed by an apparatus for controlling D2D group communication, for example, a base station.

Referring to FIG. 12, the D2D group communication control apparatus receives a scheduling request for the D2D group communication from a device (S1201). Here, the D2D group communication control apparatus determines whether or not there are scheduling requests from two or more devices (S1203). If the scheduling requests are received from the two or more devices, it is determined to which device a D2D transmission resource is first allocated (S1204).

If an allocation sequence is determined, a control procedure for a highest-priority device is started in the allocation sequence. That is, first radio resource information for a status report of D2D data to be transmitted by the device is transmitted to the device (S1205), a D2D buffer status report is received from the device (S1207), and second radio resource information including D2D resource allocation information necessary for the D2D group communication according to the D2D buffer status report received from the device is generated and transmitted to the device (S1209).

If the control procedure for one device is completed, it is determined whether or not there are any more devices to which resources for the D2D group communication need to be allocated (S1211). Likewise, the procedure of steps S1205 to S1207 is iterated for low-priority devices.

According to the above-described D2D group communication method and D2D group communication control method, it is possible to perform D2D group communication using a radio resource structure to be used between a device and a base station.

It is possible to easily implement D2D group communication by adding only elements to be additionally considered to a radio resource structure used between the device and the base station.

While the example embodiments of the present invention and their advantages have been described in detail, it should be understood that various changes, substitutions and alterations may be made herein without departing from the scope of the invention.

What is claimed is:

1. A device-to-device (D2D) group communication method for use in a device that communicates with two or more devices belonging to the same D2D group, comprising:
   transmitting a scheduling request for D2D group communication to a base station;
   receiving, from the base station, first radio resource information for a status report of D2D data to be transmitted;
   transmitting a D2D buffer status report to the base station through a first radio resource;
   receiving second radio resource information including D2D resource allocation information necessary for the D2D group communication from the base station; and
   transmitting D2D user data and control information for the D2D group communication including a D2D group identifier (ID) as a device ID and the D2D resource allocation information necessary for the D2D group communication to two or more communication partner devices belonging to the D2D group.

2. The D2D group communication method of claim 1, wherein the second radio resource information is transmitted through a downlink (DL) control channel used for transmission between the base station and the device.

3. The D2D group communication method of claim 1, wherein the control information for the D2D group communication is transmitted through a DL control channel being used for transmission between the base station and the device.

4. The D2D group communication method of claim 1, wherein the D2D user data is transmitted using a radio resource indicated by the D2D resource allocation information necessary for the D2D group communication.

5. The D2D group communication method of claim 1, wherein the D2D user data is transmitted through a DL data channel being used for transmission between the base station and the device.

6. The D2D group communication method of claim 1, wherein the second radio resource information and the control information for the D2D group communication include information regarding modulation and coding schemes to be used for the D2D group communication by the device.

7. The D2D group communication method of claim 1, wherein the scheduling request for the D2D group communication is transmitted through an uplink (UL) control channel being used for transmission between the base station and the device.

8. The D2D group communication method of claim 1, wherein the first radio resource information is received through a DL control channel being used for transmission between the base station and the device.

9. A D2D group communication method for use in a device that communicates with two or more devices belonging to the same D2D group, comprising:
   transmitting a scheduling request for D2D group communication to a base station;
   receiving first radio resource information for a status report of D2D data to be transmitted from the base station;
   transmitting a D2D buffer status report to the base station using a first radio resource; and
   receiving second radio resource information including a D2D group ID as a device ID and D2D resource allocation information necessary for the D2D group communication from the base station,
   wherein a D2D resource necessary for the D2D group communication is set to a UL data channel being used for transmission between the base station and the device.

10. The D2D group communication method of claim 9, wherein the second radio resource information includes information regarding the device that transmits D2D group data.

11. The D2D group communication method of claim 10, further comprising:
   transmitting D2D user data to two or more communication partner devices belonging to the D2D group through a UL data channel for transmission between the base station and the device, which is a D2D resource necessary for the D2D group communication if the device receiving the second radio resource information from the base station is recognized to be a device to transmit D2D group data.

12. A D2D group communication control method comprising:
   receiving a scheduling request for D2D group communication from a device;
   transmitting, to the device, first radio resource information for a status report of D2D data to be transmitted by the device;
   receiving a D2D buffer status report from the device; and
   generating second radio resource information including D2D resource allocation information necessary for the D2D group communication according to the D2D buffer status report received from the device, so as to transmit the generated second radio source information to the device.

13. The D2D group communication control method of claim 12, wherein receiving the scheduling request for the D2D group communication from the device includes:
   determining to which device a resource for the D2D group communication is first allocated when scheduling requests for the D2D group communication are received from two or more devices;
   sequentially transmitting the first radio resource information to each of the two or more devices;
   receiving a D2D buffer status report from the device; and
   transmitting the second radio resource information to the device.

14. The D2D group communication control method of claim 12, wherein:
   a resource allocated for the D2D group communication is set to a DL control channel being used for transmission between the base station and the device, and
   the second radio resource information includes a device ID indicating the device that transmits D2D group data.

15. The D2D group communication control method of claim 12, wherein:
   a resource allocated for the D2D group communication is set to a UL control channel being used for transmission between the base station and the device, and the second radio resource information includes a D2D group ID as a device ID and includes information regarding the device that transmits D2D group data.

\* \* \* \* \*